(12) United States Patent
Lonergan, III et al.

(10) Patent No.: US 10,557,496 B2
(45) Date of Patent: Feb. 11, 2020

(54) BALL JOINT

(71) Applicant: RB Distribution, Inc., Colmar, PA (US)

(72) Inventors: Joseph W. Lonergan, III, Lansdale, PA (US); David J. Grasso, Willow Grove, PA (US); Thomas Allan Reiff, Lafayette Hill, PA (US)

(73) Assignee: RB Distribution, Inc., Colmar, PA (US)

( * ) Notice: Subject to any disclaimer, the term of this patent is extended or adjusted under 35 U.S.C. 154(b) by 220 days.

(21) Appl. No.: 15/483,611

(22) Filed: Apr. 10, 2017

(65) Prior Publication Data

US 2017/0292564 A1 Oct. 12, 2017

Related U.S. Application Data

(60) Provisional application No. 62/320,123, filed on Apr. 8, 2016.

(51) Int. Cl.
*F16C 11/06* (2006.01)

(52) U.S. Cl.
CPC ........ *F16C 11/0628* (2013.01); *F16C 11/068* (2013.01); *F16C 11/0685* (2013.01); *F16C 2220/06* (2013.01); *Y10T 29/49659* (2015.01); *Y10T 403/32737* (2015.01)

(58) Field of Classification Search
CPC .............. F16C 11/0623; F16C 11/0628; F16C 11/0633; F16C 11/0638; F16C 11/068; F16C 11/0685; F16C 2220/06; Y10T 29/49659; Y10T 403/32721; Y10T 403/32737; Y10T 403/72771

USPC ...................... 403/133, 135, 139; 29/898.049
See application file for complete search history.

(56) References Cited

U.S. PATENT DOCUMENTS

| | | | | |
|---|---|---|---|---|
| 3,650,004 A | * | 3/1972 | Bergstrom | F16C 11/06 403/140 |
| 4,676,798 A | * | 6/1987 | Noiles | A61F 2/32 403/135 |
| 5,188,476 A | * | 2/1993 | Mori | F16C 11/0638 403/133 |
| 5,782,574 A | * | 7/1998 | Henkel | F16C 11/0638 403/133 |
| 6,042,293 A | * | 3/2000 | Maughan | F16C 11/0638 403/135 |

(Continued)

FOREIGN PATENT DOCUMENTS

| | | | | | |
|---|---|---|---|---|---|
| DE | | 973633 C | * | 4/1960 | .......... F16C 11/0633 |
| DE | | 2040330 A1 | * | 2/1971 | .......... F16C 11/0633 |

(Continued)

*Primary Examiner* — Josh Skroupa
(74) *Attorney, Agent, or Firm* — Volpe and Koenig, P.C.

(57) ABSTRACT

A ball joint has a bushing with a defined housing space sized to receive ball joint components. The ball joint further has a cage member having an exterior surface that fits within the housing recess and an interior surface with a pattern of raised and recessed portions, and a cup member over-molded on the cage member component. The cup member complements the interior surface pattern of the cage member and includes an interior surface having a circular configuration. The ball joint also has a stem having a ball portion dimensioned to fit within and complement the interior surface of the cup member.

15 Claims, 6 Drawing Sheets

(56) References Cited

U.S. PATENT DOCUMENTS

| | | | | |
|---|---|---|---|---|
| 6,164,829 A | * | 12/2000 | Wenzel | F16C 11/0638 |
| | | | | 403/135 |
| 6,254,114 B1 | * | 7/2001 | Pulling | F16C 11/0638 |
| | | | | 403/135 |
| 7,040,833 B2 | * | 5/2006 | Kondoh | F16C 11/0638 |
| | | | | 403/135 |
| 7,144,182 B1 | | 12/2006 | Jordan et al. | |
| 8,061,921 B2 | * | 11/2011 | Seol | F16C 11/0638 |
| | | | | 403/133 |
| 8,123,815 B2 | * | 2/2012 | Meridew | A61F 2/34 |
| | | | | 623/22.29 |
| 8,152,186 B2 | * | 4/2012 | Jeong | F16C 11/0638 |
| | | | | 403/132 |
| 8,505,204 B2 | * | 8/2013 | Reverchon | F16C 11/0614 |
| | | | | 403/133 |
| 8,905,417 B2 | * | 12/2014 | Kuroda | F16C 11/0623 |
| | | | | 403/122 |
| 9,180,013 B2 | * | 11/2015 | Grostefon | A61F 2/34 |
| 2011/0015753 A1 | * | 1/2011 | Meridew | A61F 2/34 |
| | | | | 623/22.24 |

FOREIGN PATENT DOCUMENTS

| | | | | |
|---|---|---|---|---|
| DE | 3619004 C1 * | 12/1987 | | F16C 11/0638 |
| DE | 29819487 U1 * | 5/2000 | | F16C 11/0638 |
| DE | 102006026304 A1 * | 12/2007 | | F16C 11/0638 |
| DE | 102010029137 A1 * | 11/2011 | | F16C 11/0638 |
| FR | 2436278 A1 * | 4/1980 | | F16C 11/0633 |
| GB | 839396 A * | 6/1960 | | F16C 11/0633 |
| JP | 03037409 A * | 2/1991 | | F16C 11/068 |
| JP | 2012154402 A * | 8/2012 | | F16C 11/068 |
| JP | 2015078738 A * | 4/2015 | | F16C 11/0657 |
| WO | WO-2006120787 A1 * | 11/2006 | | F16C 11/0638 |

\* cited by examiner

US 10,557,496 B2

BALL JOINT

CROSS-REFERENCE TO RELATED APPLICATIONS

This application claims the benefit of U.S. Provisional Application No. 62/320,123, filed Apr. 8, 2016, the contents of which are incorporated by reference herein as if fully set forth.

FIELD OF INVENTION

This invention relates generally to ball joint that is part of a suspension system. Because ball joints are designed for applications that connect different parts requiring relative motion, they are subject to tensile and compressive loads. More particularly, the present invention relates to ball joints that do not require greasing.

BACKGROUND

Ball joints have long been common on motor vehicles. The earlier designs comprised a metal housing having a spherical, concave socket that received a complementary spherical metal ball that was at the end of a threaded stud. Because of the metal-on-metal construction, the mating parts experience rapid wear and required regular lubrication. Later ball joint constructions incorporated a self-lubricating plastic insert for encasing the ball for movement within the socket. This self-lubricating construction has experienced failure under high compressive loads.

It is an object of the present invention to provide an improved self-lubricating ball joint construction.

SUMMARY

The present construction provides a robust self-lubricating ball joint with a simplified assembly that resists the damage from high compressive loads associated with various vehicle-operating conditions.

In one aspect, the present disclosure is directed to ball joint. The ball joint includes a bushing with a defined housing space sized to receive ball joint components. The ball joint further includes a cage member having an exterior surface that fits within the housing recess and an interior surface with a pattern of raised and recessed portions, and a cup member over-molded on the cage member component. The cup member complements the interior surface pattern of the cage member and includes an interior surface having a circular configuration. The ball joint also includes a stem having a ball portion dimensioned to fit within and complement the interior surface of the cup member.

BRIEF DESCRIPTION OF THE DRAWING(S)

DETAILED DESCRIPTION OF THE PREFERRED EMBODIMENT

Figure 1:
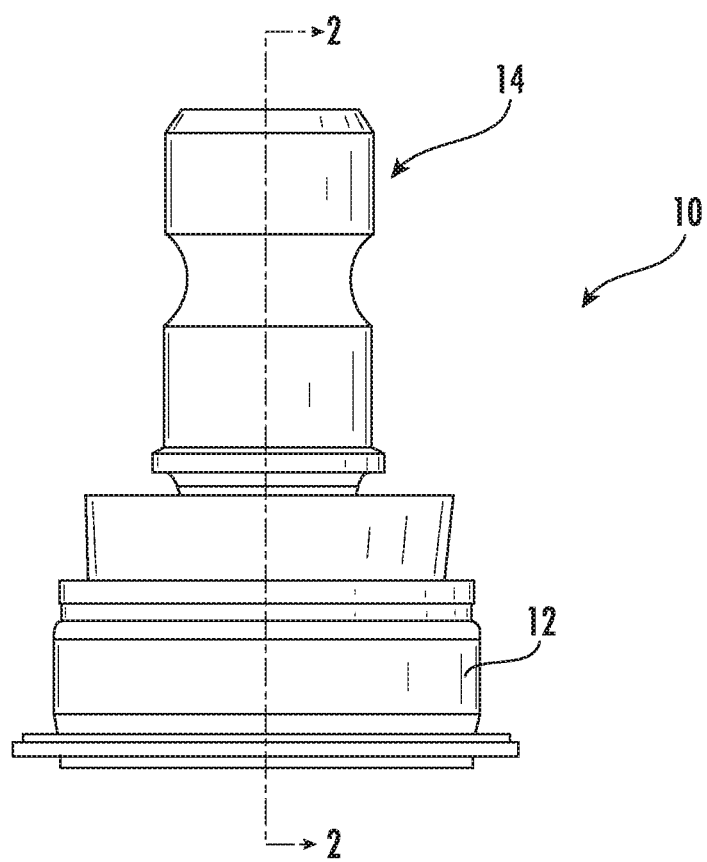
FIG. 1 illustrates an exterior configuration of a ball joint according to one embodiment of the invention.

With reference to FIG. 1, the ball joint 10 has a bushing 12 that is generally configured to fit in an aperture in a first suspension component and a stem 14, usually threaded, that is fastened to a second suspension component. The stem 14 is movable relative to the housing or bushing 12 to allow for corresponding relative movement between the suspension components.

Figure 2:
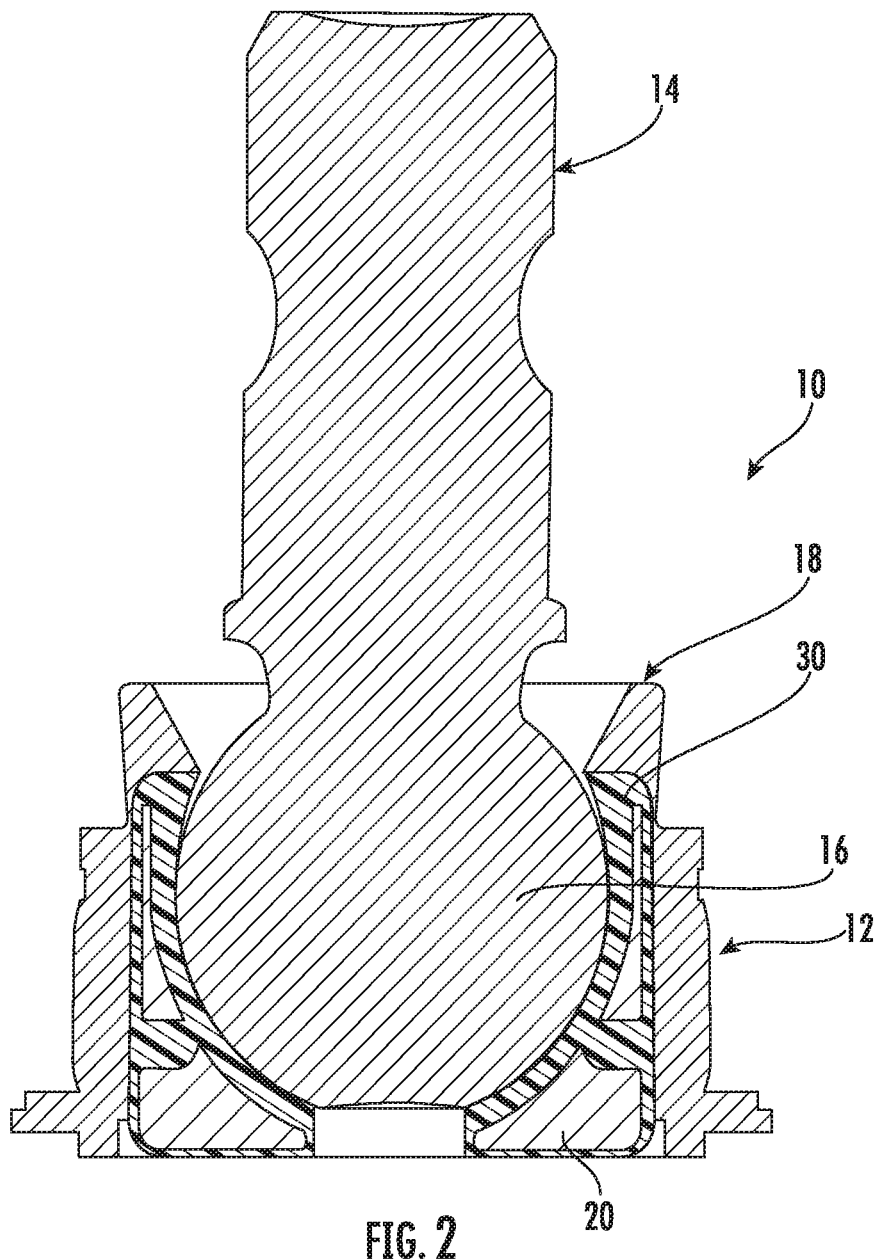
FIG. 2 Is a section along the line 2-2 of FIG. 1 and illustrates an interior configuration of the ball joint.

With reference to FIG. 2, the stem 14 terminates in a ball portion 16 that provides the mobility for the joint. The ball portion 16 is generally spherical and is connected to the stem 14 near a top portion thereof. In a typical construction, the ball portion 16 and stem 14 are integrally formed as one piece. For example, the stem 14 and ball portion 16 may be a single metal casting configured and sized according to the original equipment manufacturer's specification for the part.

The ball joint 10 further includes an assembly 18 that retains the ball portion 16. In an exemplary embodiment, the assembly 18 includes the bushing 12, a cage member 20, and a cup member 30. The cage member 20 and cup member 30 are made as an over-molded assembly, as is explained herein. The combined cage member 20 and cup member 30 are sized and shaped to fit within the bushing 12. The cup member 30 forms a bearing for contacting the ball portion 16.

Figure 3:
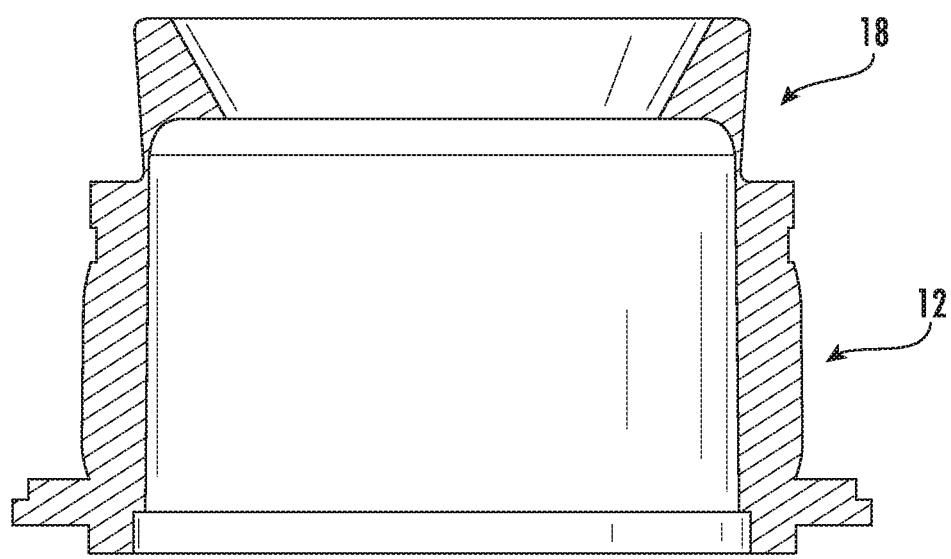
FIG. 3 is a section through the bushing that forms the bottom of the ball joint.

FIG. 3 further illustrates the bushing 12 of the assembly 18. As shown, the bushing 12 forms a housing space for receiving the combined cage member 20 and cup member 30. The bushing 12 includes an opening near a top portion thereof for allowing the stem 14 to extend therethrough. The opening may include a conical sidewall to accommodate movement of the stem 14.

Figure 4:
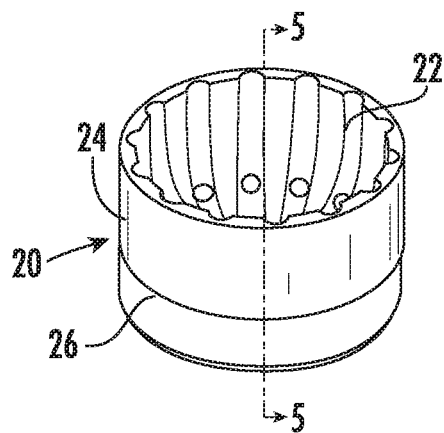
FIG. 4 is an perspective view of the cage portion of the assembly according to the present invention.
Figure 5:
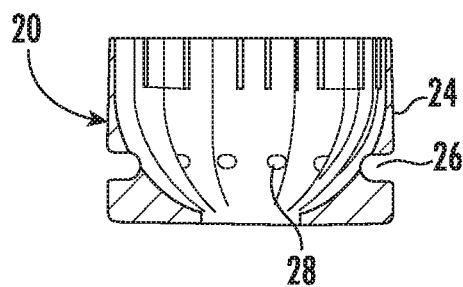
FIG. 5 is a sectional view of the cage portion of FIG. 4.
Figure 6:
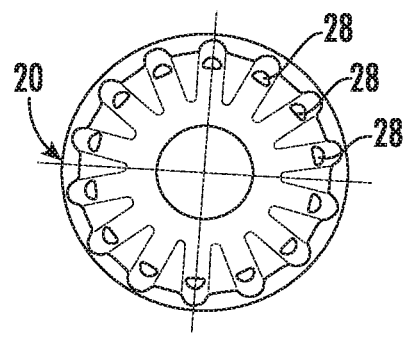
FIG. 6 is a top plan view of the cage portion of the assembly according to the present invention.

FIGS. 4-6 further illustrate the cage member 20 which is to be over-molded by the cup member 30. The cage member 20 has a pattern of raised and recessed portions around a bowl shaped interior cavity 22. In an exemplary embodiment, the raised portions form vertically-extending ribs which are separated by individual grooves. The grooves may include curved surfaces. The exterior 24 of cage member 20 is generally cylindrical with a circumferential recess 26 in the lower portion of the cage member 20. A series of apertures 28 extend between the interior 22 and the recess 26. The configuration of cage 20 is beneficial for the subsequent step of over-molding the cage member 20 with the cup member 30 that will ultimately receive the ball portion 16.

Figure 7:
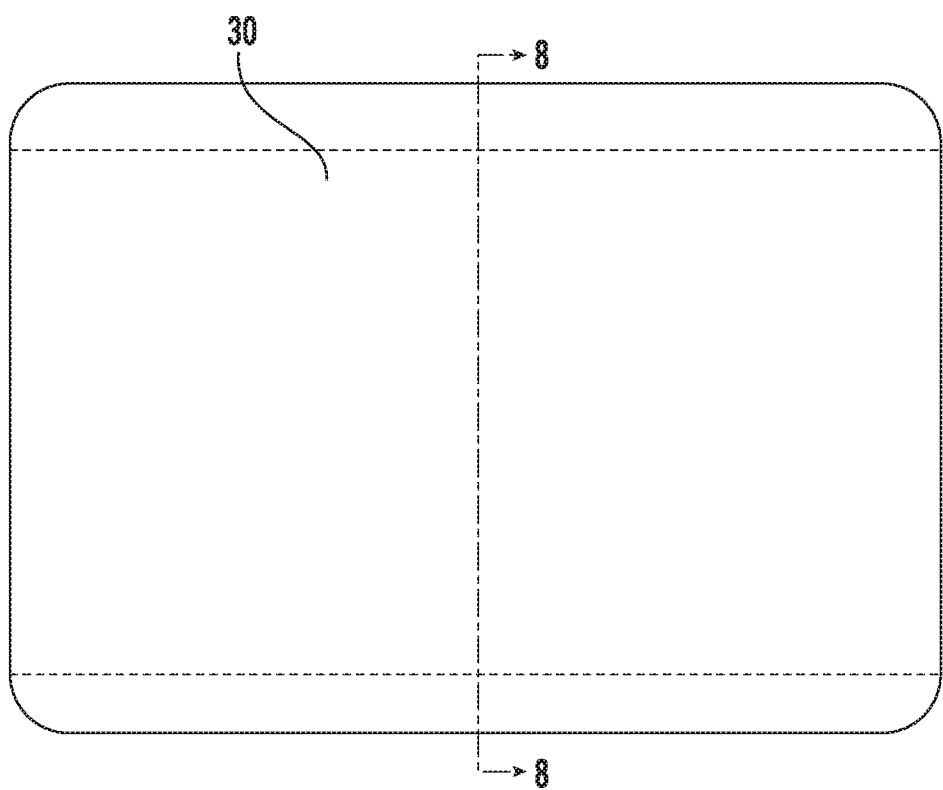
FIG. 7 is a perspective view of the over-molded cup portion of the assembly according to the present invention; and, FIG. 8 is a sectional view of the over-molded cup portion of FIG. 7.
Figure 8:
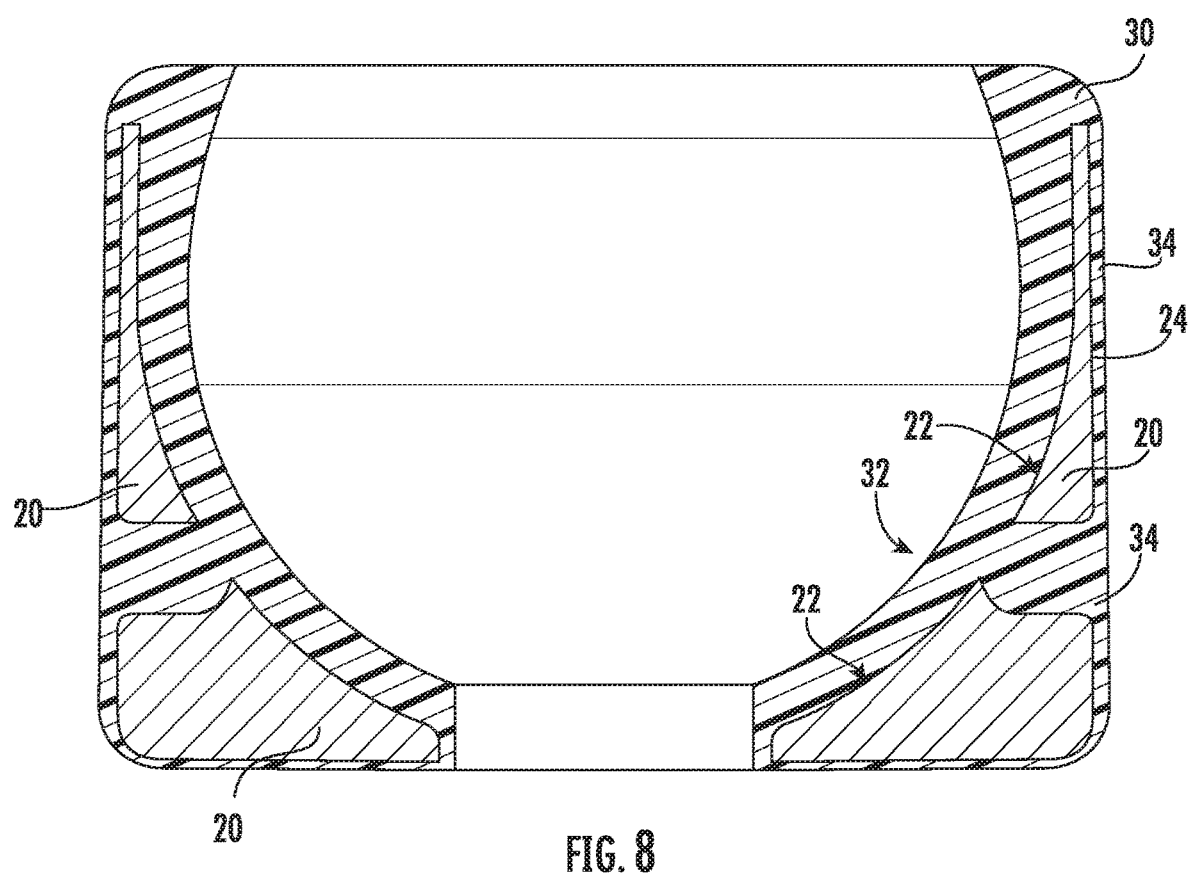

With reference to FIG. 7, there is illustrated the final over-molded combined cage and cup assembly that will be placed within the housing space of the bushing 12. With reference to FIG. 8, there is a sectional view illustrating the configuration of the over-molded combined cage and cup assembly. The cage member 20 is over-molded with a polymeric or plastic material that forms an interior surface 32, which contacts ball portion 16, and the exterior surface 34, which is received within housing space of the bushing 12. Opposite from the interior surface 32, a first surface of the cup member 30 which faces the cage member 20 from an interior of the cage member 20 complements the pattern of raised and recessed portions in the interior cavity of the cage member 20. The interior surface 32 forms a second surface that defines the smooth circular configuration. The exterior surface 34 forms a third, cylindrical surface which fits within the housing space of the bushing 12.

The polymeric material fills the grooves and covers the ribs of the interior surface pattern of the cage member 20 to form a smooth interior surface 32 for contacting the ball portion 16. The polymeric material also fills the circumferential recess 26 to form a flat exterior surface which is sized to fit in the housing space of the bushing 12. The polymeric material flows through and fills the series of apertures 28 during the over-molding process.

One known material suitable for use in moving part applications where low friction and long wear life are desired is a combination of PTFE fibers uniformly dispersed in Delrin acetal resin that is available as Delrin AF Blend from Interstates Plastics. The polymeric material over-molds the cage member 20 to produce a unified structure that fits within and is fully support by the bushing 12. This construction has the benefit of the polymeric wear surface and metallic components that provide the desired load bearing strength.

The combined cage and cup assembly is formed such that the interior surface 32, which is formed by the over-molded polymeric plastic material, contacts the ball portion 16. This excludes the possibility of undesirable metal-on-metal contact while allowing the structural support of the cage member 20 embedded in the cup member 30. The pattern of raised and recessed portions around the interior of the cage member 20 increase a surface area with which the over-molded cup material contacts and produce a series of undulations and/or grooves which help to frictionally retain the over-molded material. The circumferential recess 26 and the series of apertures 28 further help to retain the over-molded material. The resulting combined cage and cup assembly is a robust component for use in the ball joint 10.

In an exemplary method of forming the ball joint 10, the cage member 20 is provided and a polymeric material is over-molded on the cage member 20. The polymeric material fills the grooves and covers the ribs of the interior surface pattern of the cage member 20 to form a smooth interior surface for contacting the ball portion 20. The polymeric material also flows through the apertures 28 and fills the recess 26 forming an integral structure which includes the cage member 20 embedded in the cup member 30. In the method, the bushing 12 is also provided, and the combined cage and cup assembly is inserted in the housing space. In addition, the stem 14 is provided and the ball portion 16 thereof is inserted in the interior space defined by the combined cage and cup assembly such that the stem 14 extends through the opening in the bushing 12.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A ball joint comprising:
   a bushing that defines a space sized to receive ball joint components;
   a metallic cage member that fits within the defined space of the bushing, the metallic cage member has a surface with a pattern of raised and recessed portions that form vertically-extending ribs and grooves;
   a bearing having an exterior surface that complements the pattern of raised and recessed portions in the surface of the cage member and an interior surface that defines a circular configuration; and,
   a stem having an end with a ball portion dimensioned to fit within the interior surface of the bearing.

2. The ball joint of claim 1, wherein the bushing is metallic.

3. The ball joint of claim 1, wherein the bearing is non-metallic.

4. The ball joint of claim 3, wherein the bearing is a polymeric material.

5. The ball joint of claim 1, wherein the vertically-extending ribs and grooves are alternating.

6. The ball joint of claim 5, wherein material that forms the bearing fills the grooves, covers the ribs and forms the circular configuration of the bearing.

7. The ball joint of claim 1, wherein the cage member has a series of apertures, the bearing is a polymeric material, and the polymeric material of the bearing is in the series of apertures.

8. A method of making a ball joint comprising the steps of:
   providing a bushing with a defined space sized to receive ball joint components;
   providing a metallic cage member having a surface with a pattern of raised and recessed portions that form vertically-extending ribs and grooves;
   over-molding a polymeric material on the metallic cage member to define a bearing having a first surface that complements the pattern of raised and recessed portions of the cage member, a second surface that forms an interior circular configuration, and a third surface which fits within the defined space of the bushing; and
   providing a stem having a ball portion dimensioned to fit within the interior circular configuration of the second surface of the bearing.

9. The method of claim 8, wherein the vertically-extending ribs and grooves are alternating, and wherein the polymeric material fills the grooves and covers the ribs during the over-molding step to form the interior circular configuration of the bearing.

10. The method of claim 8, wherein the cage member includes a series of apertures and the polymeric material fills the series of apertures.

11. A ball joint comprising:
    a bushing with a defined space sized to receive ball joint components;
    a metallic cage member having an exterior surface that fits within the defined space and an interior surface with a pattern of raised and recessed portions that form vertically-extending ribs and grooves;
    a cup member over-molded on the cage member, the cup member complements the interior surface pattern of the metallic cage member and includes an interior surface having a circular configuration; and, a stem having a ball portion dimensioned to fit within and complement the interior surface of the cup member.

12. The ball joint of claim 11, wherein the bushing is metallic.

13. The ball joint of claim 11, wherein the cup member is non-metallic.

14. The ball joint of claim 13, wherein the cup member is a polymeric material.

15. The ball joint of claim 11, wherein the vertically-extending ribs and grooves are alternating.

* * * * *